United States Patent
Hsia et al.

(10) Patent No.: US 7,055,037 B2
(45) Date of Patent: May 30, 2006

(54) HIGH PERFORMANCE GRAY-LEVEL WATERMARKING SYSTEM

(75) Inventors: Shih-Chang Hsia, Zhang Hua (TW); I-Chang Jou, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 846 days.

(21) Appl. No.: 10/090,834

(22) Filed: Mar. 6, 2002

(65) Prior Publication Data
US 2003/0172274 A1    Sep. 11, 2003

(51) Int. Cl.
*H04L 9/00*    (2006.01)
*G06K 9/00*    (2006.01)

(52) U.S. Cl. ...................... 713/176; 382/100
(58) Field of Classification Search ................ 713/176; 382/100
See application file for complete search history.

(56) References Cited

U.S. PATENT DOCUMENTS 6,332,030 B1*  12/2001  Manjunath et al. ......... 382/100

* cited by examiner

*Primary Examiner*—Gilberto Barron, Jr.
*Assistant Examiner*—Grigory Gurshman
(74) *Attorney, Agent, or Firm*—Rosenberg, Klein & Lee (57) ABSTRACT

The present invention relates to a gray-level watermarking system, in which sub-band and codebook technique are applied, and the feature of progressive transformation is utilized so as to randomly and evenly distribute the watermark to the entire data with the robustness and the visibility reduced. A four-fold key system is developed with encrypted key to exact the watermark, thus forming a system capable of protecting internet-transmitted multimedia signals such as audio, video ones that are combined with the watermark from being detected or attacked.

10 Claims, 7 Drawing Sheets

HIGH PERFORMANCE GRAY-LEVEL WATERMARKING SYSTEM

FIELD OF THE INVENTION

The preset invention relates to the watermarking system for data protection. More particularly, the new invention system can provide gray level signal watermarking for images, video, music and speech applications.

BACKGROUND OF THE INVENTION

In recent years, Internet system has become popular for transmitting and receiving digital data. Because the nature of Internet is an open system, transmitted data is easily copied, altered or even stolen. Hence communication security becomes a major concern. Moreover, digitized multi-media data such as image, video and music signals have been widely transmitted using this open system for its convenience. The problem of copyright protection becomes a most controversial subject. Unfortunately, at the present time, the protection technique is nowhere near perfect. Hence large amount of unauthorized duplication is found daily. In order to resolve this problem, watermarking techniques [1–4] have become a popular tool to protect the secrecy of the transmitted document. To achieve a high performance watermarking, the algorithm must possess properties of invisibility, security and robustness. In recent literatures, most authors [5–7] concentrated on using binary data watermarking, such as "logo" or "text", the gray-level image watermarking for protecting multi-media data has rarely been discussed. In this invention, a gray-level data watermarking based on sub-band filtering and codebook principles is developed. In order to accomplish a high security watermarking, we avoid using the original data to extract watermark. Instead, we develop a private-key system for protecting watermark, which gives an additional security level.

SUMMARY OF THE INVENTION

Although many watermarking algorithms have been developed in recent years, most of them concentrated on using binary data such as logos or texts. In this invention, the sub-band filtering approach is successfully employed for a gray-level data watermarking. With signal processing in the frequency domain, the feature of progressive transformation is utilized to disperse the watermark into the entire data and to enhance the robustness. The watermark is randomly dispersed into the high frequency portion of the original data. We achieved good hiding quality, which makes the unfriendly attempt on either duplication or alternation extremely difficult. To extract the watermark, we develop a four-fold key system rather than using the original data. And the privacy key is further encrypted to increase the degree of security. Furthermore, the progressive feature of DCT is used to enhance the robustness of watermarking. Even if the composite data is under attacked, the watermark can be restored from the residual coefficients, where the resulting watermark only suffers different degree of blurring but no serious distortions. Our watermark algorithm possesses the nature of good vision quality, high security, and a strong robustness. The watermarking scheme can provide good protection on the secrecy of multi-media data transmission over the current internet system, and no double shall contribute substantially on resolving the copyright violation problems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

It is well known that the spectrum of a data can be divided into four sub-bands [8], the LL band, LH band, HL band and HH band to represent its frequency components of 2D-signal. Filters for different bands can be obtained from the following equations $$LL \text{ band}: X_{LL} = H_{LL}(x_{ij}) = \frac{1}{C} \sum_{n1=0}^{m1} \sum_{n2=0}^{m2} x_{ij} W_1^{-kn1} W_2^{-kn2}, \quad (1)$$

$$LH \text{ band}: X_{LH} = H_{LH}(x_{ij}) = \frac{1}{C} \sum_{n1=0}^{m1} \sum_{n2=0}^{m2} x_{ij} W_1^{-kn1} W_2^{-(k+\pi)n2}, \quad (2)$$

$$HL \text{ band}: X_{HL} = H_{HL}(x_{ij}) = \frac{1}{C} \sum_{n1=0}^{m1} \sum_{n2=0}^{m2} x_{ij} W_1^{-(k+\pi)n1} W_2^{-kn2}, \quad (3)$$

$$HH \text{ band}: X_{HH} = H_{HH}(x_{ij}) = \frac{1}{C} \sum_{n1=0}^{m1} \sum_{n2=0}^{m2} x_{ij} W_1^{-(k+\pi)n1} W_2^{-(k+\pi)n2}; \quad (4)$$

where C is a constant for transformation. Using different frequency factors W1 and W2, transformations such as the Discrete Fourier Transform (DFT), Discrete Cosine Transform (DCT), etc. can be selected at will. We adapt the DCT for it has been widely used in watermarking applications. In order to reconstruct the data without frequency aliasing, transformation should have the Quadrature Mirror Filter (QMF) feature [9]. To confirm QMF in 2D transforms, horizontal symmetry, vertical symmetry and cross symmetry properties must be achieved first. In discrete signal processing, a 2D spatial block {fjk} is transformed into a DCT block by $$F_{uv} = C_{uv} \sum_{j=0}^{N-1} \sum_{k=0}^{N-1} f_{jk} W_{jk}^{uv} = FDCT(f_{jk}), \quad (5)$$

$$W_{jk}^{uv} = \cos\left(\frac{(2j+1)u\pi}{2N}\right)\cos\left(\frac{(2k+1)v\pi}{2N}\right).$$

DCT transformation can easily achieve horizontal symmetry, vertical symmetry and cross symmetry by observing $$W_{(N-k-1)}^{uv} = (-1)^v W_{jk}^{uv},$$

$$W_{(N-j-1)k}^{uv} = (-1)^u W_{jk}^{uv}$$

and $$W_{(N-j-1)(N-k-1)}^{uv} = (-1)^{u+v} W_{jk}^{uv}$$

respectively. For 2D sub-bands, we can define each band according to equations (1)–(4) as: (a) LL band $F_{LL}=F_{u1,v1}$, $|u1|<N/2$ and $|v1|<N/2$; (b) LH band $F_{LH}=F_{u2,v2}$, $N/2>|u2|$ and $N>|v2|\geq N/2$; (c) HL band $F_{HL}=F_{u3,v3}$, $N>|u3|\geq N/2$ and $|v3|<N/2$; (d) HH band $F_{HH}=F_{u4,v4}$, $N>|u4|\geq N/2$ and $N>|v4|\geq N/2$.

In order not to confuse the "watermark data" and "watermarked data", we shall name the former as the "watermark" and the latter as the "composite data" hereafter. Let $\tilde{f}_{jk}$ denote a composite data where a watermark $w_{jk}$ has been embedded onto an original data $f_{jk}$. Clearly, the nature of a watermark is that it must be perceptually invisible in order to prevent any attempt on the composite data by unfriendly sources. Intuitively, the high frequency portion of the original data is an ideal place to insert a watermark since the great variation in high frequency makes the watermark much more difficult to detect. As the original data is divided into 8×8 blocks, its sub-bands can be obtained from $$F_{uv} = FDCT(f_{jk})_{8\times 8} = \begin{pmatrix} F_{LL} & F_{LH} \\ F_{HL} & F_{HH} \end{pmatrix}_{8\times 8} = \begin{pmatrix} F_{u1v1} & F_{u2v2} \\ F_{u3v3} & F_{u4v4} \end{pmatrix}_{8\times 8}. \quad (6)$$

The HH band components $F_{HH}$ can be viewed as a measuring parameter to search for high frequency blocks. Let us define $P_{HH}$ as $$P_{HH} = \sum |F_{HH}| = \sum_{u4=4}^{7} \sum_{v4=4}^{7} |F_{u4,v4}|, \quad (7)$$

which denotes a high frequency factor of the HH sub-band. As the $P_{HH}$ value is larger, the block frequency variance becomes higher. We search and record the $P_{HH}$ value of each block in accordance with its relative block coordinate (m,n), and use the $P_{HH}$ (m,n) to denote the high frequency variance for (m,n)$^{th}$ block. If the $P_{HH}$ (m,n)>Variance-Threshold, which means this block is capable to embed a watermark without visible distortion. Then this high frequency block should be marked, for next discussions, let M(m,n) denote a coordinate of one marked block.

In order to disperse the spatial correlation of the watermark, the entire watermark $w_{jk}$ is transformed by DCT. Then the DCT coefficients can be split into sub-bands as $$W_{uv} = FDCT(w_{jk})_{m1\times m2} = \begin{pmatrix} W_{LL} & W_{LH} \\ W_{HL} & W_{HH} \end{pmatrix}_{m1\times m2}, \quad (8)$$

where the watermark size is m1×m2. Since the $W_{LL}$ band contains more information about the watermark, only their DCT coefficients are embedded into the marked blocks. The value of the LL band coefficient is usually large due to the full picture transformation. To reduce visible distortion, we need to quantize these coefficients before the embedding operation. Then equation (8) is simplified to $$\tilde{W}_{uv} = \frac{1}{Q_{m1m2}} \begin{pmatrix} W_{LL} & 0 \\ 0 & 0 \end{pmatrix}_{m1\times m2} = \begin{pmatrix} \tilde{W}_{LL} & 0 \\ 0 & 0 \end{pmatrix}_{m1\times m2}, \quad (9)$$

where $Q_{m1m2}$ are parameters from a quantization table. Note that the rank of $\tilde{W}_{LL}$ is one quarter of that of $\tilde{W}_{uv}$. In order to reduce the bit-rate of the watermark further, we repeat the above procedure to produce a second layer LL band $\tilde{\tilde{W}}_{LL}$ from the first layer $\tilde{W}_{LL}$. Thus total bit-rate of the watermark is now reduced to 1/16 of the original one.

As coefficients of $\tilde{\tilde{W}}_{LL}$ are embedded into the marked blocks, we aim to achieve good hiding quality, high security and strong robustness. This can be easily done since only one coefficient of $\tilde{\tilde{W}}_{LL}$ is inserted into the high frequency portion of each marked block. Thus the watermarked block becomes $$\tilde{F}_{uv} = \begin{pmatrix} F_{LL} & F_{LH} \\ F_{HL} & \overline{F}_{HH} \end{pmatrix}_{8\times 8} \quad (10)$$

where $\overline{F}_{HH}$ contains one watermark coefficient. Note that the marked blocks are randomly distributed, hence the watermark information is dispersed on the original picture everywhere. Finally, DCT coefficients are converted into spatial domain by using the inverse DCT transformation, hence the composite data is obtained by $\tilde{f}_{jk}$=IDCT($\tilde{F}_{uv}$) of each sub-block.

Figure 1:
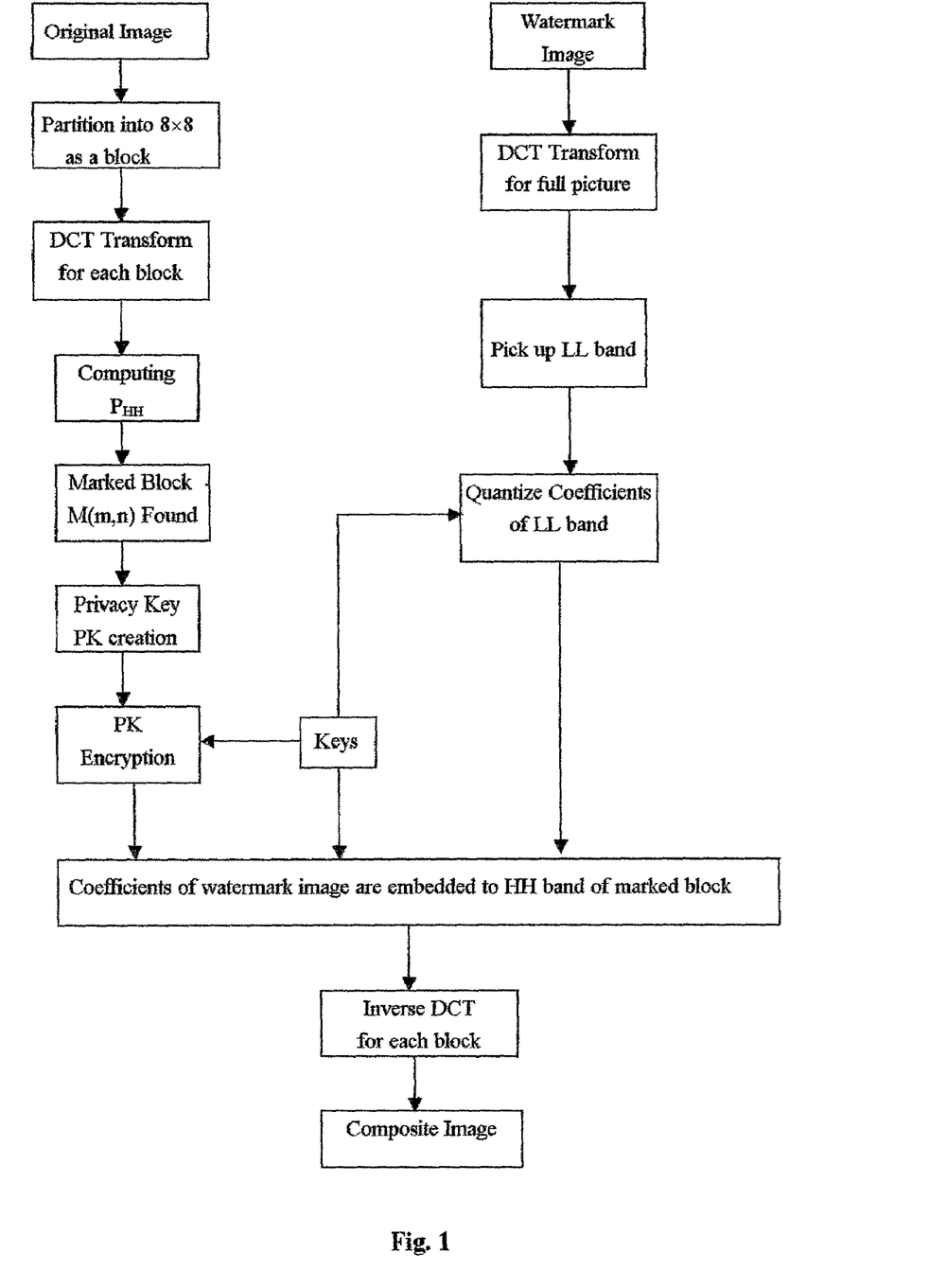
FIG. 1 is a flow chart of the embedding process for watermark based on sub-band theory.

The marked coordinate is an important information for restoring the watermark, M(m,n) can be treated as a key to restore the watermark. Let us define a privacy key PK as $$PK=\{M1,M2,\ldots, Mn\}, Mx \subset M(m,n), x=1 \text{ to } n, \quad (11)$$

which is a set of coordinates of the marked blocks. In order to attain high security, the privacy key can be further re-permuted by using conventional coding techniques, such as data encryption, etc. [10]. However, no algorithm is capable to remain undecoded forever, but we can create multiple privacy keys for our watermark with time-dependent codes to increase the difficulty of decoding and hence to prolong the duration of secrecy. Therefore users have a Key Bank, KB={PK0, PK1, ..., Y}, where KB contains Y privacy keys to be used at various appropriate times. The complete embedding procedure of our algorithm is illustrated in FIG. 1.

In our watermarking system, we employ the designated keys rather than the original data to extract watermark. These keys are computed according to the frequency variance of original datas, and are independent of the watermark. So they can be pre-stored on disks in the decoder of the authorized user. To extract watermark, we only need to send the composite data to users without the keys. The key in our algorithm has four folds. They are (a) Privacy Key: provides the position of the marked blocks. (b) Permutation Function key: decrypts random values into normal ones. (c) Quantization Table of $\tilde{W}_{LL}$: provides the de-quantization for DCT coefficients of the watermark. (d) Embedding Coefficient Location: extracts the watermark coefficient from HH band of the marked blocks. In general, the procedure of extraction is just the opposite of the embedding operation. The keys that are pre-stored in the Key Bank use the same parameter for both encoder and decoder, where each user key is corresponding to one original data. Since the composite data is very similar as the original data, we can select one user key from Key Bank according to the composite data without any additional information required.

Figure 2:
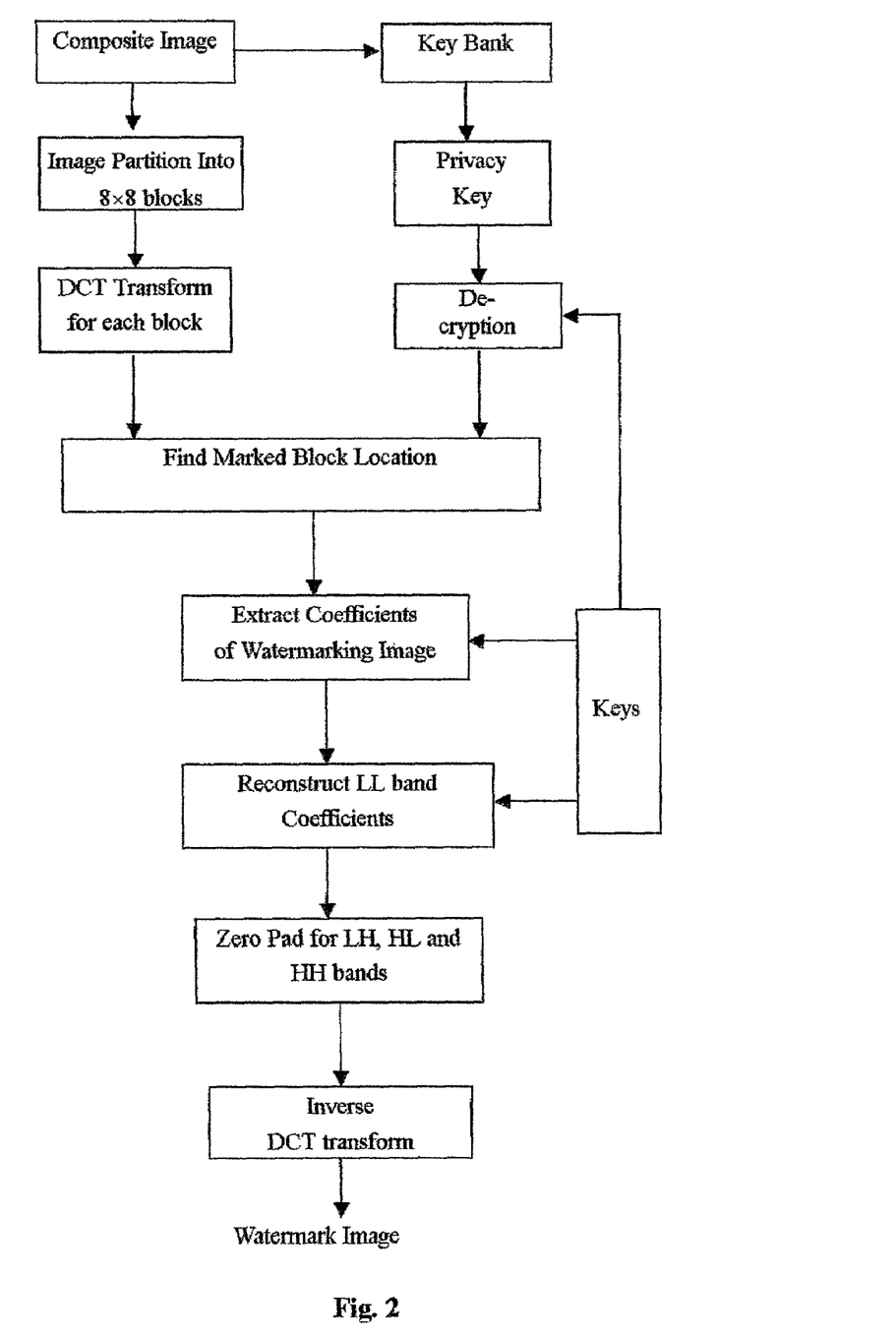
FIG. 2 is a flow chart of the watermark extraction.

FIG. 2 shows the steps for watermark extraction. When users receive a composite data, it is first partitioned into 8×8 blocks. Since the watermark is hidden on DCT domain, these blocks should be transformed by DCT first, i.e. $\tilde{F}_{uv}$ (Extract)=DCT$(\tilde{f}_{jk})_{8\times 8}$. As previously mentioned, watermark coefficients are embedded in the high frequency blocks, and the position of these marked block is recorded in the privacy key. By referring the different composite data, one can choose the appropriate privacy key from the Key Bank where the key order is re-permuted by decryption procedures. Hence the watermark coefficients are sequentially extracted from the HH band of $\tilde{F}_{uv}$ (Extract) in the marked blocks. Finally, the LL band matrix of the watermark can be reconstructed. To restore the watermark, we need to combine the LH band, HL band and HH band of the watermark for a complete 2D sub-band processing. However, data in these bands are not used in our approach, so we must insert zeros to LH, HL and HH bands to achieve a complete matrix. After a de-quantization procedure, we can reconstruct the coefficient matrix $\hat{W}_{uv}$ of the watermark, and finally the watermark can be extracted from the inverse DCT of $\hat{W}_{uv}$.

The other watermarking invention uses the codebook concept. In the first stage, the original data and watermark data all need be transformed to DCT domain. When the frame size of original picture $f_{jk}$ is M1×N1, we take a full-frame transformation. Thus the DCT coefficients are attained form $$F_{u1v1} = FDCT(f_{jk})_{M1\times N1} = \begin{pmatrix} F_{00} & F_{01} & F_{02} & F_{0(M-1)} \\ F_{10} & F_{11} & & F_{1(M-1)} \\ \cdots & \cdots & \cdots & \cdots \\ F_{(N-1)0} & \cdots & & F_{(N-1)(M-1)} \end{pmatrix}_{M1\times N1}, \quad (12)$$

where u1 and v1 are frequency indexes for coefficient $F_{u1v1}$. By the same way, we attain the watermark coefficients from $$W_{u2v2} = FDCT(w_{xy})_{M2\times N2} = \begin{pmatrix} W_{00} & W_{01} & W_{02} & W_{0(M2-1)} \\ W_{10} & W_{11} & \cdots\cdots & W_{1(M2-1)} \\ \cdots & \cdots & \cdots & \cdots \\ W_{(N2-1)0} & \cdots & & W_{(N2-1)(M2-1)} \end{pmatrix}_{M2\times N2}, \quad (13)$$

where the watermark data size is M2×N2, and its frequency indexes use u2 and v2. To avoid the visible distortion after embedding process, the high frequency part of $F_{u1v1}$ is good choice to insert watermarking information since human eyes are difficult to detect high frequency component. However, when the watermark coefficient is embedded to the high frequency part, the watermark coefficient should be lost after data compression because high frequency component is spatial redundancy.

Based on frequency codebook concept, we propose a new approach to realize the watermarking system. As a watermarking coefficient $W_a$ is to be embedded, its vector can be found from codebook. The coefficient matrix in (1) is treated as a codebook content. So the codebook is a set of picture coefficients. With coefficient-by-coefficient searching, we can find the minimum differential value between watermarking coefficient and codebook coefficient after n1×m1 points compared, which is given by $$(\text{Diff})_{min} = \text{Min}(W_a - F_b), F_b \in F_{u1v1}. \quad (14)$$

where Min is minimum value search function. The watermarking coefficient is matched the codebook coefficient by minimum difference. The relative coordinate in matrix (1) can be recorded as a vector. To embed the watermarking information, the watermarking coefficient is rather than the original picture coefficient with $$[F_b]_{\in Diff(min)} = W_a, \quad (15)$$

where $[F_b]_{\in Diff(min)}$ is corresponding to the vector location of minimum difference. By the same way, the next watermarking coefficient is processed. The relative coordinate also requires to be recorded for each coefficient. Anyway, when the codebook coefficient has replaced by one watermarking coefficient in the previous search, the coefficient is not changed again for the next watermark coefficient processing. Totally, there are n2×m2 watermarking coefficients to be embedded. Finally, we can attain the relative vector according to the coordinate location from each watermark coefficient. Hereafter, the vector is named as $W_a(m,n)$ to denote the coefficient $W_a$ located on (m,n) coordinate. The $W_a(m,n)$ is an import-nt information to restore watermark. So $W_a(m,n)$ can be treated as a privacy key (PK) [22] that is defined by $$PK = \{M1, M2 \ldots Mn\}, Mx \subset W_a(m,n), x=1 \text{ to } n2\times m2, \quad (16)$$

PK is a set of vector for watermarking information.

After the embedding process, the transform coefficient of original picture involves the watermarking coefficient. We get the new coefficient matrix with $$\tilde{F}_{ulvl} = \begin{pmatrix} F_{00}W_{31}F_{02}F_{03}W_{12}F_{05} \cdots \\ W_{21}W_{35}F_{12}F_{13}W_{14}F_{15} \cdots \\ F_{20}W_{05}W_{62}W_{33}F_{24}W_{02} \cdots \\ \cdots \end{pmatrix}_{ul\times vl}, \quad (17)$$

where some coefficients have been replaced by watermarking coefficients. Finally, the frequency coefficients are converted into spatial domain using inverse transform with $$\tilde{f}_{jk}^1 = IDCT(\tilde{F}_{ulvl}), \quad (18)$$

Figure 3:
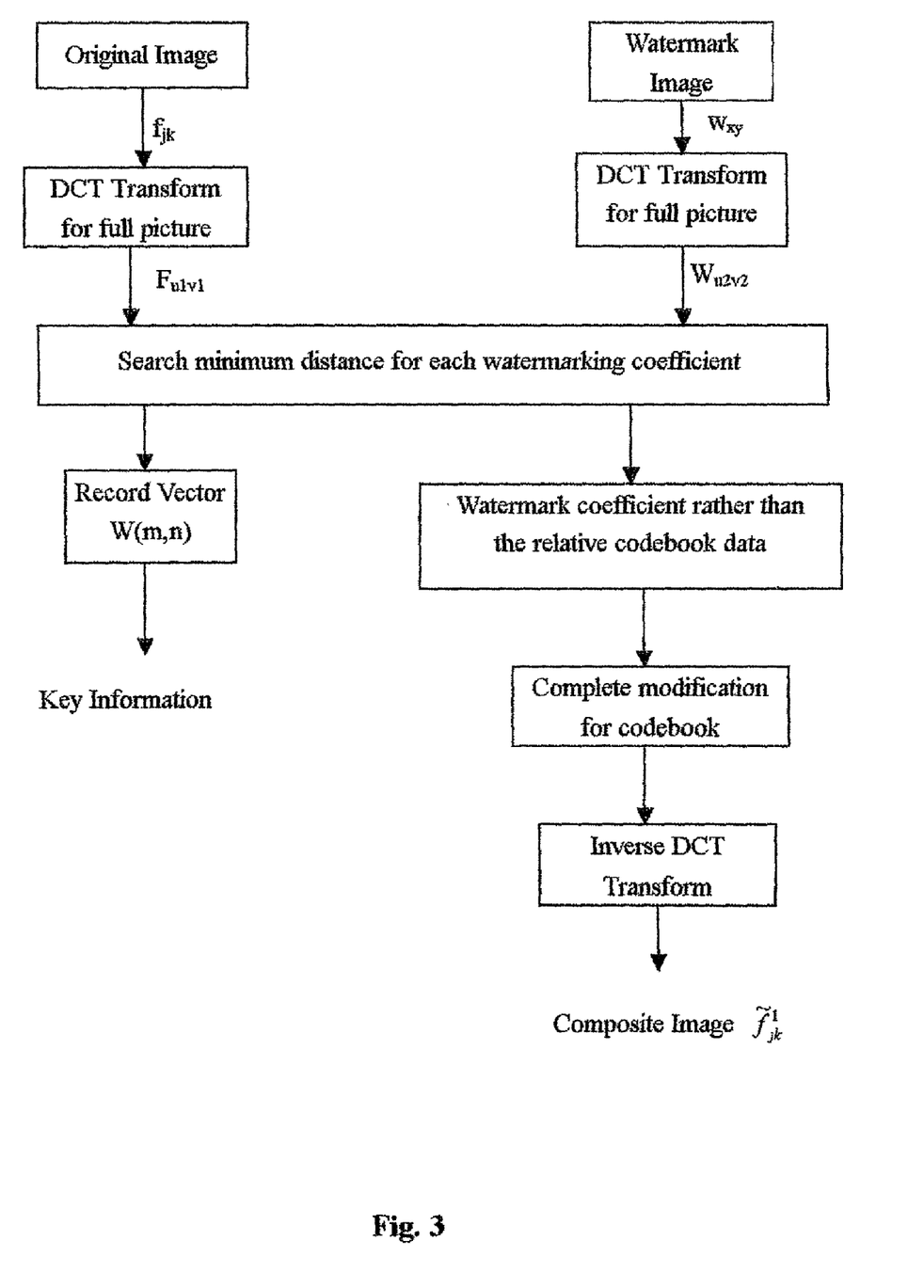
FIG. 3 is a flow chart of the watermark embedding process using codebook concept.

$\tilde{f}_{jk}^1$ denotes the composite data in the first layer output. The embedding procedure of the proposed algorithm is illustrated in FIG. 3.

Figure 4:
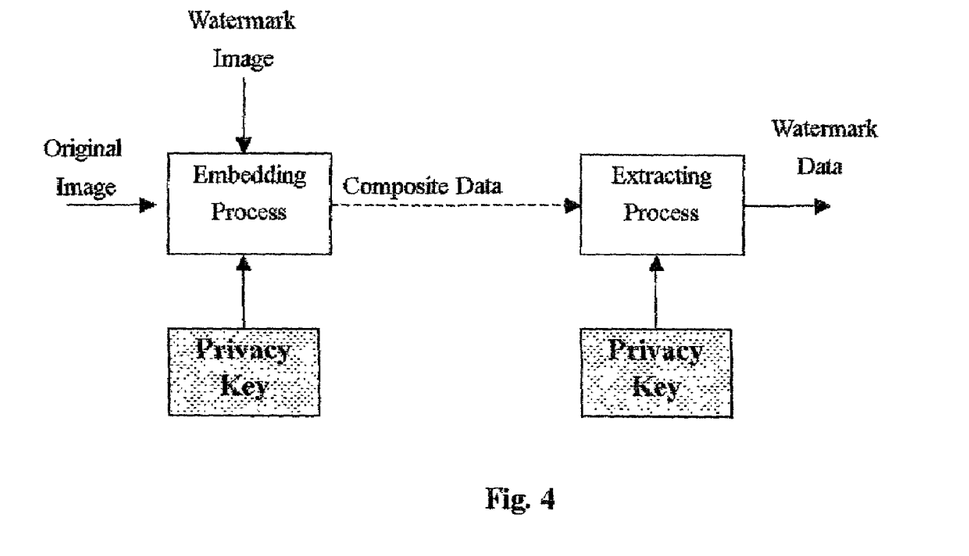
FIG. 4 a flow chart of the encoder and the decoder using the same key.
Figure 5:
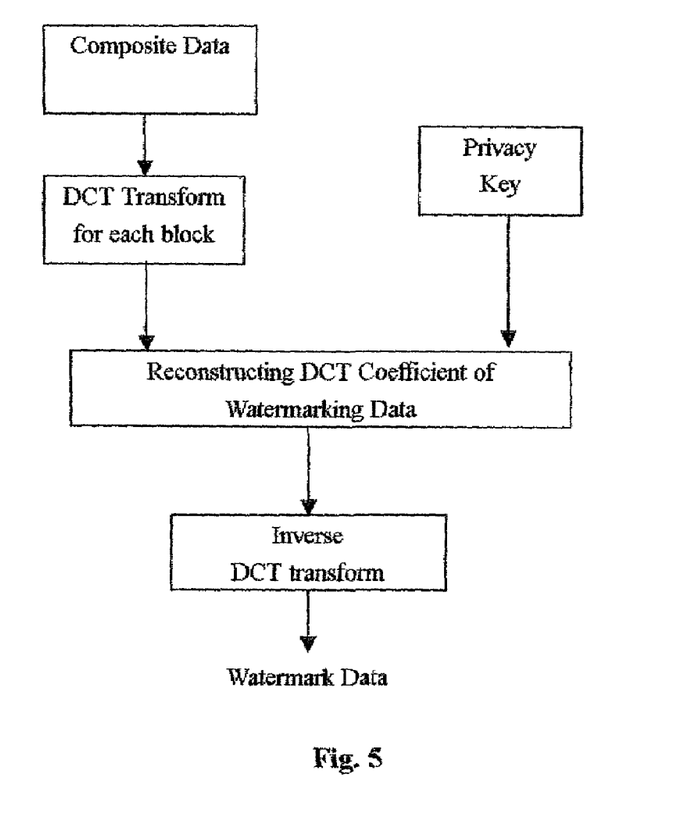
FIG. 5 is a flow chart of the codebook method for watermark extraction.

The procedure of extracting operation is an inverse operation of the embedding one. As receiving the composite data, we only need the key parameter rather than original data to extract watermark. Since the key is a secret data, we need use the same key both of the transmitter and receiver, as shown in FIG. 4. FIG. 5 indicates the processing step for watermark restoration. When the composite data is received, the data should be transformed by DCT since the watermarking information is hidden on the frequency domain. So we have $$\tilde{F}_{uv} = DCT(\tilde{f}^1_{jk})n1 \times m1. \quad (19)$$

Using the privacy key, we could find the watermark coefficient from codebook. Then each coefficient is sequentially extracted according to the privacy key and the codebook content. Then the watermark coefficient matrix $\hat{W}_{uv}$ can be reconstructed. The reconstructed watermark data could be attain from inverse transform of $\hat{W}_{uv}$ with $$\hat{w}_{xy} = IDCT(\hat{W}_{uv})_{n2 \times m2} \quad (20)$$

The watermarking information is hidden into the composite data and its privacy key. In order to increase security, we propose the second layer processing to hide the privacy key to enhance the communication security. Since we have used the frequency domain processing in the first layer, in order to avoid the frequency spectrum aliasing, we employ spatial domain processing consisting of the encryption approach in the second layer.

Figure 6:
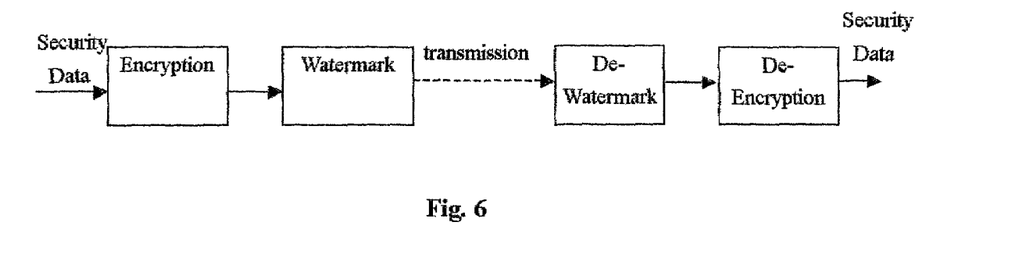
FIG. 6 is a flow chart of the mixing system by encryption and watermarking methods.

The encryption approaches had been used in the past twenty years. As the secret data is encrypted, the output becomes a scrambled data by predetermined key. The attacker can easily detect the data whether or not is encrypted. Since the computing power increases very fast today, the complex encryption system also can be de-encrypted by using statistical analysis. Although the watermarking system can efficiently avoid the attackers' detection, the security level is low. Once the watermark is detected, the attacker can be easy to extract the secret data. Therefore, we develop a mixing system with the encryption consisting of watermark system. The basic structure is shown in FIG. 6. The encryption can increase the security level for watermark. And watermarking can protect the encryption to be detected.

In our watermarking system, the privacy key is treated as a secret information. In order to increase the security level, the privacy key can be re-permuted by using conventional encryption methods, such as DES. As the key is encrypted by the encryption method, we have the new PK (NPK) from $$NPK = \text{Encryp}(PK). \quad (21)$$

The encryption approach can provide high security to protect the privacy key. In order to avoid the encryption operation to be detected, the second layer hidden is employed.

Figure 7:
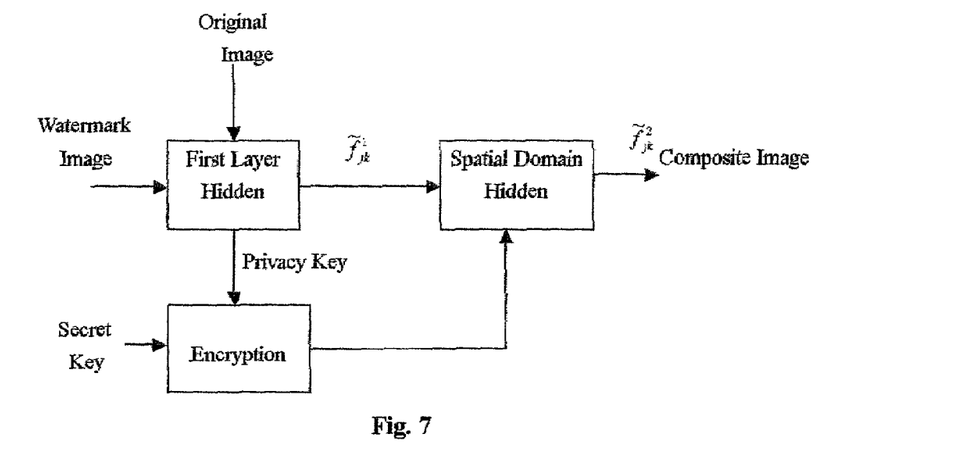
FIG. 7 a flow chart of the second layer processing using encryption and spatial domain hidden.
Figure 8:
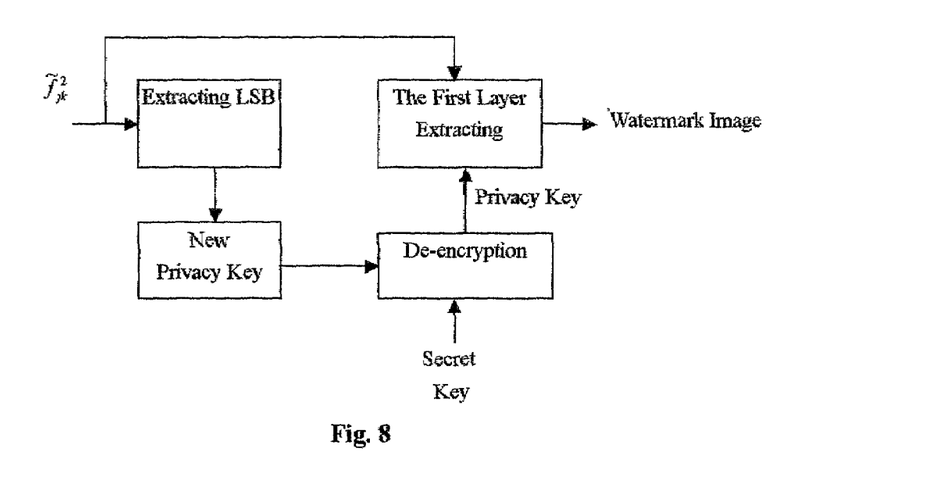
FIG. 8 is a flow chart of the watermark data extracting from two layers hidden.

To enhance security, the new PK can be further hidden into the composite data using spatial domain processing to avoid attackers' detection. One has simple and efficient method, the key is considered to embed the LSB bit of pixel in composite data, then we have $$\tilde{f}^2_{jk} = (\tilde{f}^1_{jk})_{LSB} \leftarrow (NPK)_{Bit}, \quad (22)$$

where $$\tilde{f}^2_{jk}$$

is the second layer composite data. The NPK data use bit-by-bit to insert the LSB of $$\tilde{f}^1_{jk}$$

from left-to-right and top-to-bottom sequentially. The first layer consists of the second layer with encryption and spatial domain processing is shown in FIG. 7. The decoding system block is illustrated in FIG. 8. As we receive $$\tilde{f}^2_{jk},$$

the LSB is extracted to attain the key information. After de-encryption, the privacy key can be re-restored. According to the privacy key and $$\tilde{f}^2_{jk},$$

we can reconstruct the watermark data.

As the composite data size is m1×n1, we have m1×n1 bits space to embed the key information. The coordinate resolution (m,n) presents each watermark coefficient vector, then the watermarking data size m2×n2 can be determined by $$\frac{m1 \times n1}{m+n} \geq m2 \times n2. \quad (23)$$

As the key information is embedded into LSB bits of each pixel, the data quality degrades very small. Moreover, the privacy key has been encrypted, to detect the watermarking information becomes very difficult. Thus the security level becomes higher as double hidden procedure is used. In fact, this watermarking system is the mixing process of the frequency and spatial domain hidden. In first layer, the frequency codebook watermark is employed using the DCT domain. And the privacy key is scrambled using the encryption approach consisting of spatial processing in the second layer.

Currently, JPEG compressor has been widely used to reduce the data size. However, most of the watermark data is discarded after JPEG processing as well. In order to overcome this drawback, a high robustness algorithm for JPEG processing is invented. In the JPEG compressor [12], the data is partitioned into 8×8, and then is transformed by DCT processing. These DCT coefficients are quantized using a particular quantization table, which can be expressed as $$\hat{F}_{uv} = \frac{DCT(\tilde{f}_{jk})_{8\times 8}}{Q_{uv}}, \quad (24)$$

where $Q_{uv}$ is the quantization level that is dependent on the u and v component, $\tilde{f}_{jk}$ is a composite data that is attained from (8), and $\hat{F}_{uv}$ is the final quantized coefficient. For RLC/VLC package, the coefficient $\hat{F}_{uv}$ should be truncated into an integer. In fact, the LSB bit of each coefficient is not exact after the truncation processing. Thus the compression performance is not changed too much as the privacy key information is embedded into LSBs of non-zero coefficients. With this concept, we first search all non-zero coefficients. Then the LSB of non-zero coefficient is modified by one-bit of the privacy key, which is given by $$\begin{cases} \text{If} & (\hat{F}_{uv}) \text{ is odd, then}(\hat{F}_{uv})_{LSB} = 0, \text{ as}(\text{Key})_{bit} = 0 \\ \text{If} & (\hat{F}_{uv}) \text{ is even, then}(\hat{F}_{uv})_{LSB} = 1, \text{ as}(\text{Key})_{one\ bit} = 1, \text{ as } \hat{F}_{uv} \neq 0 \\ \text{Else} & (\hat{F}_{uv})_{LSB} \text{ No Change} \end{cases} \quad (25)$$

The information of the privacy key is sequentially inserted into the LSB location of each non-zero coefficient with bit-by-bit approach. Since only LSBs of non-zero DCT coefficients are modified, the compression ratio is not affected.

Figure 9:
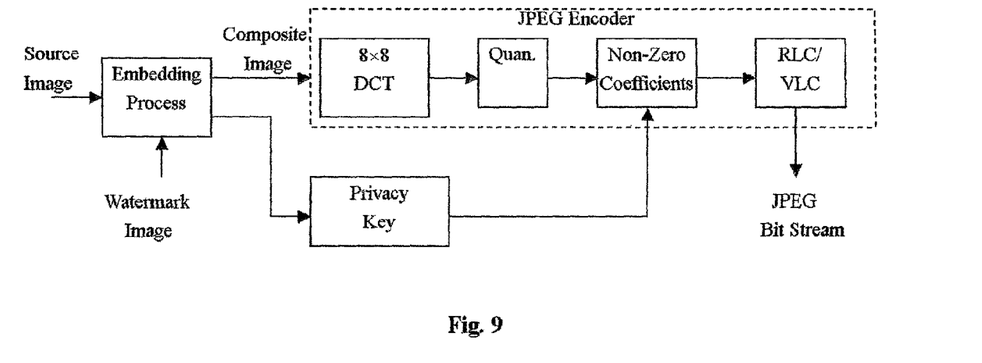
FIG. 9 is a flow chart of embedding the privacy key into JPEG domain.
Figure 10:
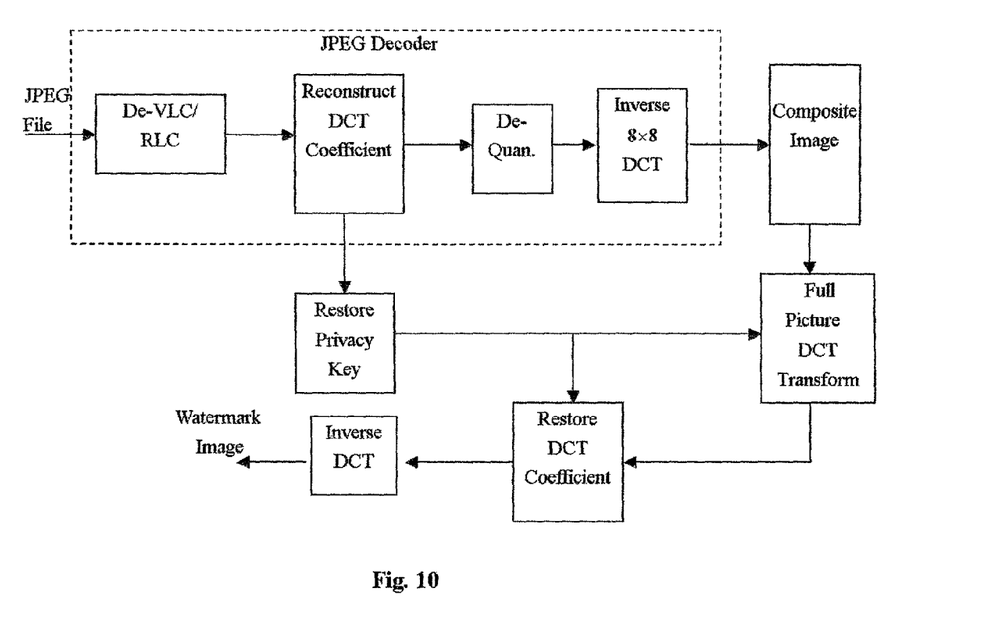
FIG. 10 is a flow chart of the watermark data being extracted from JPEG file.

FIG. 9 illustrates the privacy key embedded into non-zero coefficients on the JPEG encoder. FIG. 10 illustrates the JPEG decoder system block for the watermark data extracting. From the JPEG file, the composite data is reconstructed after JPEG decoder. Simultaneously, the privacy key is extracted from each non-zero coefficient. Then the composite data is transformed into DCT domain. According to the privacy key, the coefficients of the watermark data can be extracted. Finally, the watermark data can be restored from inverse DCT processing.

From the above mentions, how much the key information embedded has to be counted. The total bit of the key information is $n2\times m2\times \log_2(n1\times m1)$ since there are $n2\times m2$ keys and each key with $\log_2(n1\times m1)$ bits. After JPEG processing, the number of non-zero coefficients (NNZC) in the full frame is computed by If $$\hat{F}^i_{uv} \neq 0,$$

then NNZC=NNZC+1, where i=1 to $(n1/8)\times(m1/8)$, u,v=0 to 7 (26), where $$\hat{F}^i_{uv}$$

denote the quantized coefficient at the (u,v) location for the $i^{th}$ block, and the composite data is split into $(n1/8)\times(m1/8)$ blocks as a block size is 8×8. To embed the key information completely, the following equation $$NNZC \geq n2\times m2\times \log_2(n1\times m1), \quad (27)$$

need be satisfied. Otherwise, some key information would be discarded, and the extracting quality will degrade accordingly. In fact the NNZC becomes smaller after quantization. Eq. (27) is seldom satisfied in practical case, except the watermark data size is further reduced or the source data size is further enlarged, but the hiding system shall become no efficiency. For practical applications, we present three scanning approaches as below.

Figure 11:
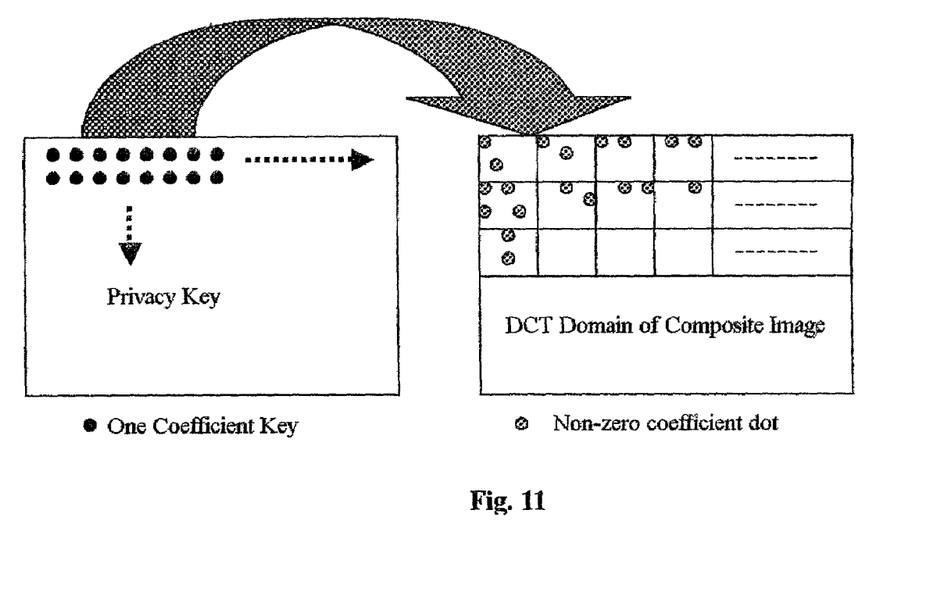
FIG. 11 shows privacy keys sequentially inserted into non-zero coefficients.

Since DCT transformation has a progressive feature, each coefficient implies one spatial resolution. The watermark data can be restored using only a few DCT coefficients. The sequential procedure is shown in FIG. 11, where the key information is scanned to insert JPEG bit-stream with block-by-block processing. Until all non-zero coefficients are completely processed, the inserting procedure is stopped. Because the amount of the key information is much larger than that of non-zero coefficients, the extracting quality is not good generally. Intuitively, we can increase the number of non-zero coefficients to improve the data quality, but this scheme will reduce the compression ratio. Instead, the high-efficiency scanning styles are presented.

Figure 12:
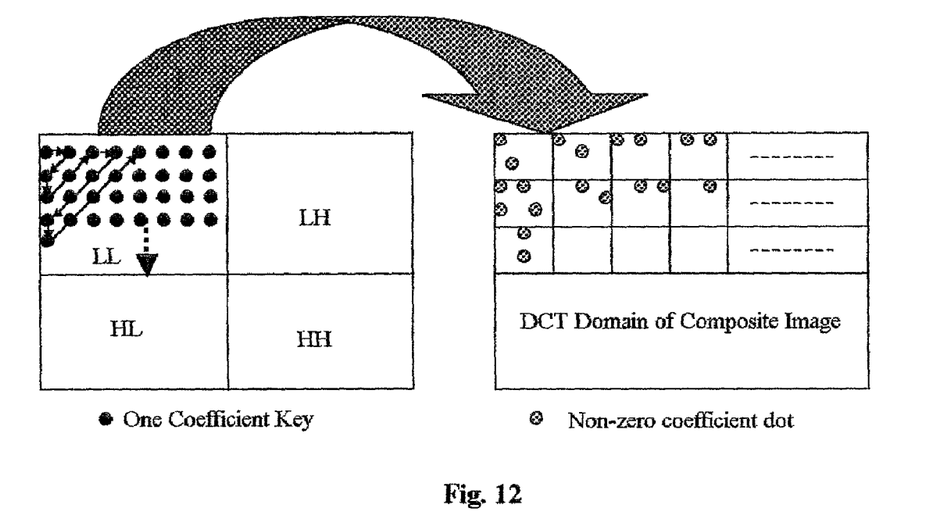
FIG. 12 shows the key insertion with the zigzag scan for LL band.

Because most of the data energy is compacted into the low frequency band in the DCT domain, the key information located at the low frequency area is first considered to embed. Based on a sub-band concept the coefficients can be split into LL, LH, HL and HH bands. In order to keep a regular processing flow, only LL band information is imbedded by using the zigzag scan as shown in FIG. 12. The zigzag scan likes as the run length coding within JPEG compressor, the scanning direction is from left-top corner to right-bottom for the LL band only.

Since the DCT coefficients are independent, the data can be approximately reconstructed from inverse transformation with coefficient-by-coefficient approach. As the coefficient value is larger, its weight is larger to affect the reconstructed result. To improve the data quality, the key position corresponding to a larger coefficient is first inserted. Because the coefficients are random distribution on the codebook, one-bit flag is required to record the current coefficient whether or not to be selected. For LL band processing, there are $n2/2\times m2/2$ bits used to mark the available coordinate. The number of maximum weight coefficient (NMWC) recorded for the key processing can be computed as $$NMWC = \frac{NNZC - (n2/2\times m2/2)}{\log_2(n1 + m1)}, \quad (28)$$

The processing procedures using the maximum weight scan are:
    (a). Pre-computing NNZC and NMWC.
    (b). Find the maximum coefficient and record its corresponding key position.
    (c) The one-bit flag is set to high, and counter=counter+1.
    (d) The next maximum coefficient is processed with repeating (b)–(c), until the counter=NMWC.

Although we sacrifice one bit space to record the location of maximum weight coefficients, the larger weight coefficients used can improve the inverse transformation result.

As previously mentioned, we had used two-layer DCT domain hidden. First the DCT coefficients are hidden on the frequency codebook. The codebook vector is treated as a privacy key. Then the privacy key is further hidden into DCT coefficients in the bit stream of JPEG domain. This approach can meet three requirements for the data hiding systems:

invisible, robustness and security. The watermark data becomes invisible since its coefficients are embedded with the best match from the codebook content. Our approach can provide a high robustness for JPEG compressing because of the random coefficient distribution over the entire data. With double DCT layer hidden, a high security for the watermark data protection is achieved.

What is claimed is:

1. A watermark embedding process using a sub-band filtering, wherein original data for an entire image are split into N×N blocks and then is transformed into a frequency domain with N being an integer greater than 1, and an HH band with N/2×N/2 coefficients is tested on a high frequency feature; transforming a full watermark image data into the frequency domain LL band coefficients of the watermark image data being quantized and inserted into a block of the HH band having the tested high frequency feature; a composite data of the original data and the watermark data being produced by an inverse transformation of each block of the original data.

2. A watermark embedding process comprising original data for an entire image being split into N×N blocks and then transformed into a frequency domain with N is an integer greater than 1, and an HH band with N/2×N/2 coefficients being tested on a high frequency feature; the high frequency being recorded for watermark insertion; watermark data being transformed into the frequency domain with data of the entire image; LL band coefficients being quantized and inserted into the HH band of a marked block of the original data; a composite data of the original data and the watermark data being produced by an inverse transformation of each block of the original data; extraction of the watermark image data utilizes: (a) Privacy Key providing position of the marked blocks; (b) Permutation Function key decrypting random values into normal ones; (c) Quantization Table of $\tilde{W}_{LL}$: providing de-quantization for DCT coefficients of the watermark; (d) Embedding Coefficient Location extracting the watermark coefficient from the HH band of the marked blocks; thus allowing the watermark to be extracted by means of first splitting the composite data into N×N blocks and transforming same to DCT domain; the watermarking coefficients being capable of being extracted from the HH band of each block with system keys; the watermark being then restored without using an original data; the watermark information being independent of the original data, allowing the system key to be pre-stored in the decoder.

3. A codebook based watermarking of the process of claim 1, wherein the original data and watermark data all are transformed to the frequency domain with full pictures, and the coefficient matrix of the original data are contents of the codebook; each watermarking coefficient being mapped to the codebook and inserted to the codebook; a best match being found and a coordinate thereof being recorded as the system key; the composite data being created from a modified codebook.

4. A composite system of the encryption and the watermark of the process as claimed in claim 2, wherein the encryption is used to increase the security level and then watermarking process is used to hide the encrypted data; the key being encrypted and further watermarked by a second layer hidden; an encrypted bit of key being embedded to the LSB of the original data.

5. A JPEG processing of the watermark embedding process of claim 4, wherein the bit of key is inserted to the LSB bit of non-zero DCT coefficient, and LL band of the watermark data for key information is scanned by a zigzag scan and a maximum weight scan to JPEG domain.

6. The watermark embedding process of claim 1, wherein the watermark can be restored with only a certain degree of blurring but no serious distortion when the original data is under attack.

7. The watermark embedding process of claim 1, wherein the watermark data include audio and video ones.

8. The watermark embedding process of claim 1, wherein the watermark is gray-level data.

9. The watermark embedding process of claim 1, wherein the watermark is binary data.

10. The watermark embedding process of claim 1, wherein the transformation is a DCT (discrete Cosine transform).

* * * * *